United States Patent [19]
Takeuchi et al.

[11] Patent Number: 5,635,959
[45] Date of Patent: Jun. 3, 1997

[54] INFORMATION-PROCESSING APPARATUS EQUIPPED WITH A CORDLESS PEN

[75] Inventors: Hidefumi Takeuchi; Yuichi Hataguchi, both of Nara, Japan

[73] Assignee: Sharp Kabushiki Kaisha, Osaka, Japan

[21] Appl. No.: 417,848

[22] Filed: Apr. 6, 1995

Related U.S. Application Data

[63] Continuation of Ser. No. 187,477, Jan. 28, 1994, abandoned.

[30] Foreign Application Priority Data

Feb. 26, 1993 [JP] Japan .................................. 5-037928

[51] Int. Cl.$^6$ .................................................. G09G 5/00
[52] U.S. Cl. .................................................. 345/179; 178/18
[58] Field of Search .................................. 345/179, 182, 345/169, 156, 901, 905, 173, 180, 181; 178/18, 19; 340/568, 571; 248/918; 361/681; 206/224, 371; 364/709.1, 709.11

[56] References Cited

U.S. PATENT DOCUMENTS

| | | | |
|---|---|---|---|
| 4,564,078 | 1/1986 | Enokido et al. ........................ | 178/18 |
| 4,742,478 | 5/1988 | Nigro, Jr. et al. ..................... | 361/681 |
| 5,053,749 | 10/1991 | Weiss ..................................... | 340/571 |
| 5,065,604 | 11/1991 | Pattock ................................... | 70/239 |
| 5,166,668 | 11/1992 | Aoyagi .................................... | 345/183 |
| 5,248,030 | 9/1993 | Tarozzi ................................... | 206/1.7 |

FOREIGN PATENT DOCUMENTS

| | | | |
|---|---|---|---|
| 435511 | 7/1991 | European Pat. Off. ............... | 345/179 |
| 2100712 | 4/1990 | Japan . | |
| 2125324 | 5/1990 | Japan . | |

Primary Examiner—Chanh Nguyen
Attorney, Agent, or Firm—Birch, Stewart, Kolasch & Birch, LLP

[57] ABSTRACT

An information-processing device equipped with a cordless pen includes a cordless pen used for input operation and a pen storing portion for storing the cordless pen and operates: to give an alarm with a buzzer, etc., when no pen input is made and when the cordless pen is not replaced in excess of a given period of time; or to give a warning with a buzzer or the like when a cabinet of the apparatus is closed without the pen stored in the pen storage portion; or to prevent the operation of an electric power switch by means of a locking lever when the pen is not stored in place.

7 Claims, 15 Drawing Sheets

AFTER PEN IS STORED

101 UPPER CABINET
107 RECESS
106 PEN HOLDING CASE
105 CORDLESS PEN
108 ELECTRIC POWER SWITCH
102 LOWER CABINET
103 KEYBOARD
104 DISPLAY PORTION

BEFORE PEN IS STORED

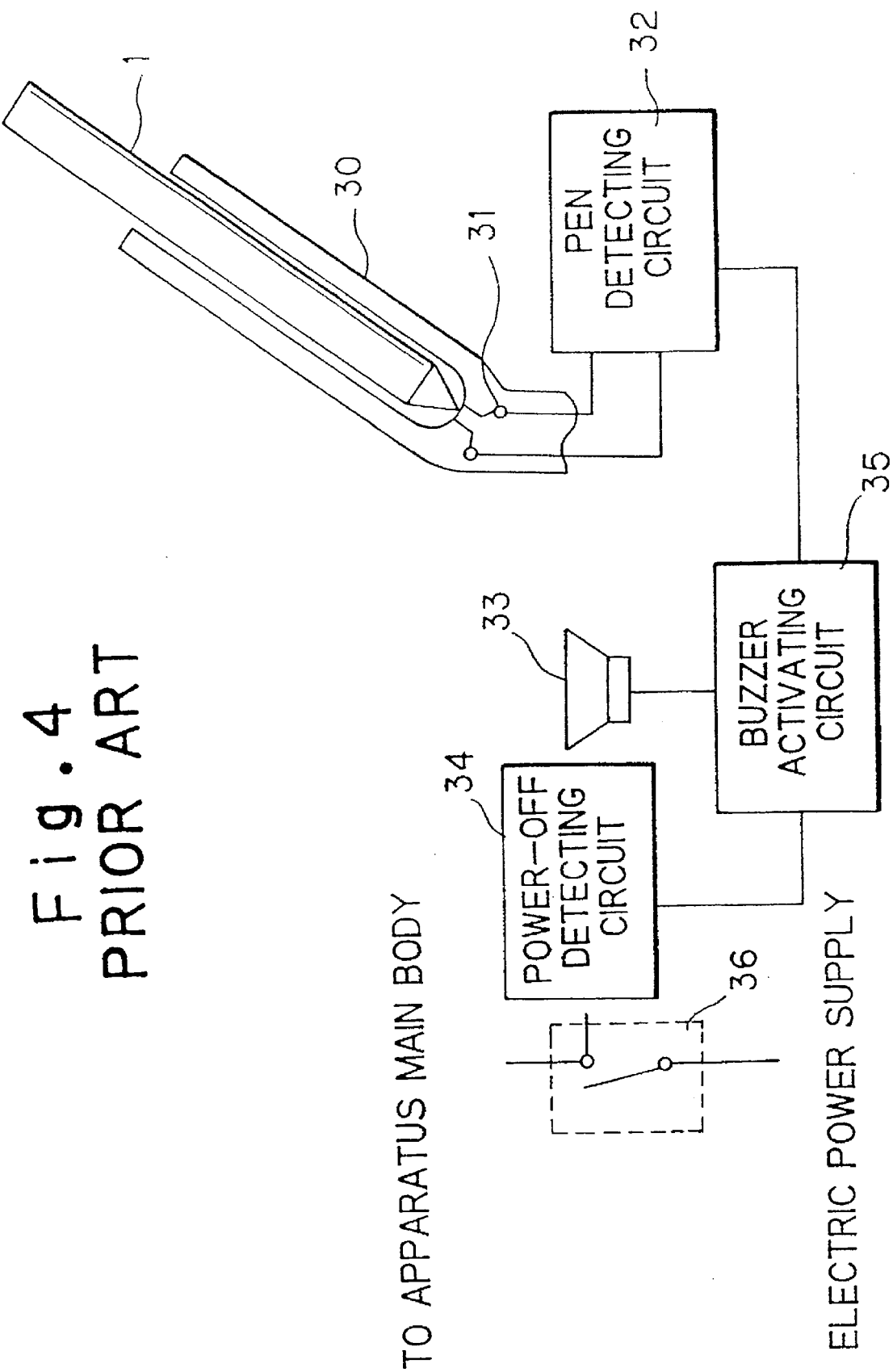

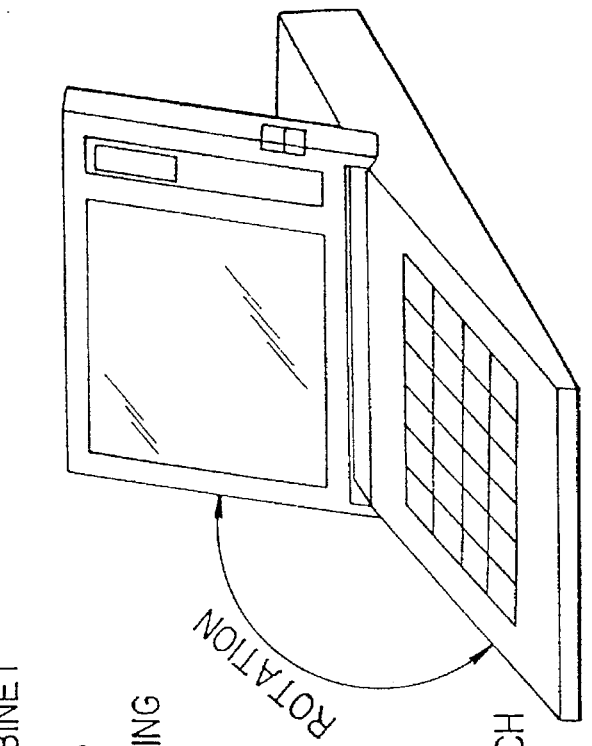

9 PEN STORAGE SENSOR

6 PEN HOLDING CASE

BEFORE PEN STORED

AFTER PEN STORED

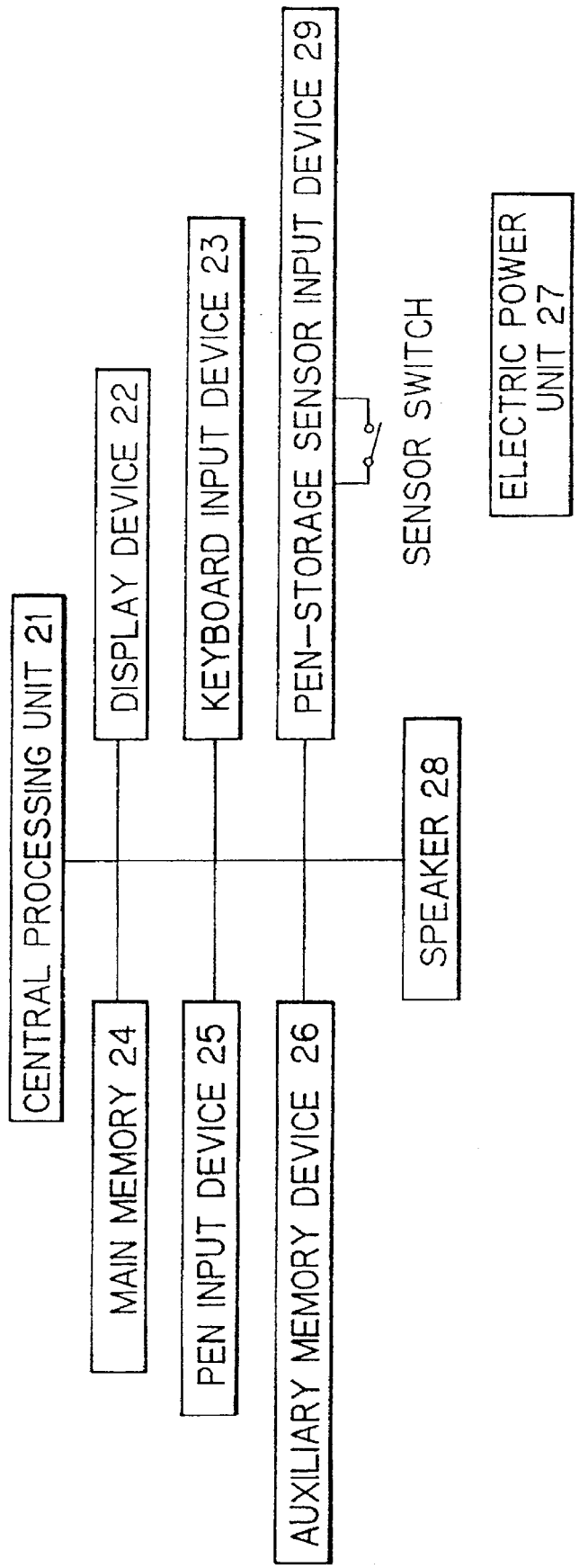

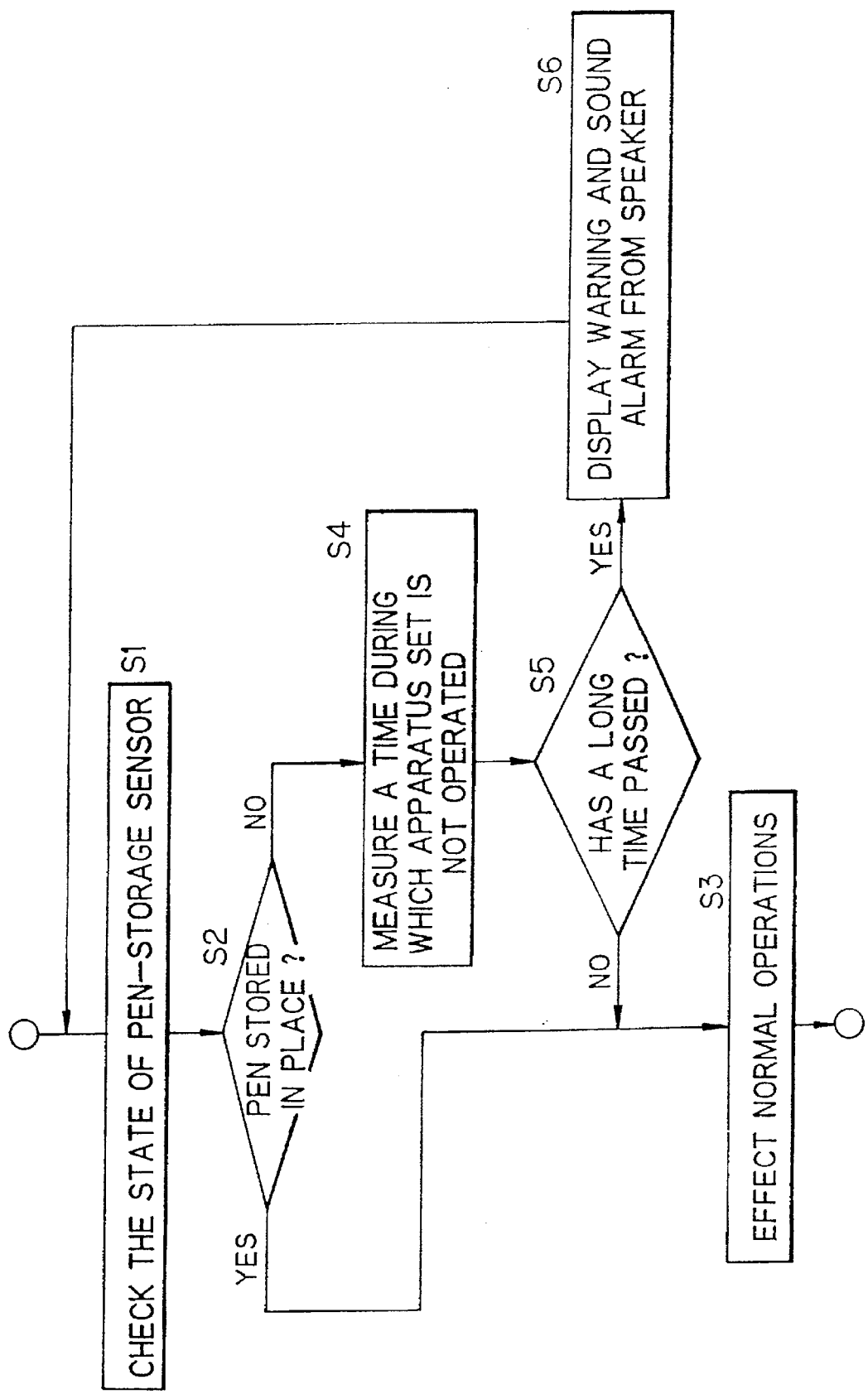

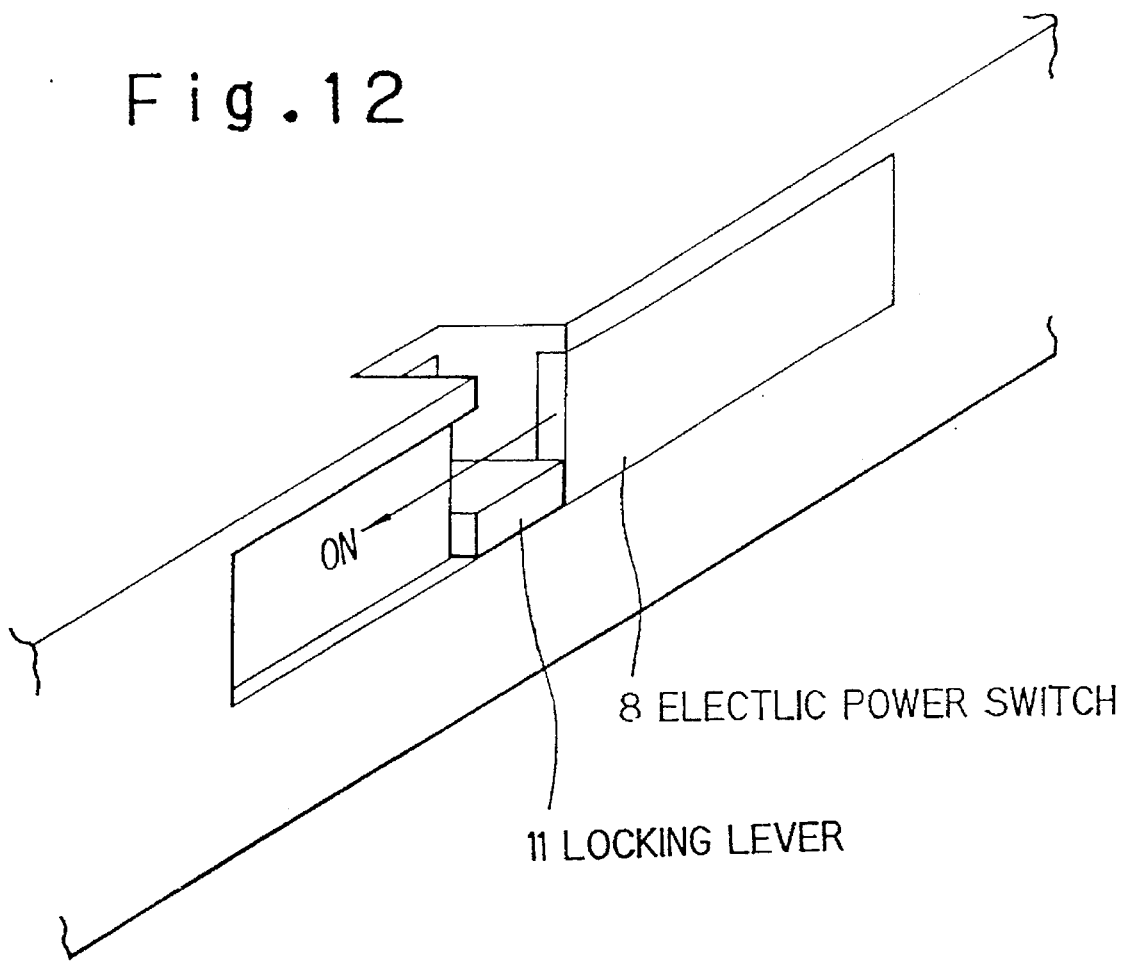

BEFORE PEN IS STORED

11 LOCKING LEVER

8 ELECTLIC POWER SWITCH

11 LOCKING LEVER

AFTER PEN IS STORED

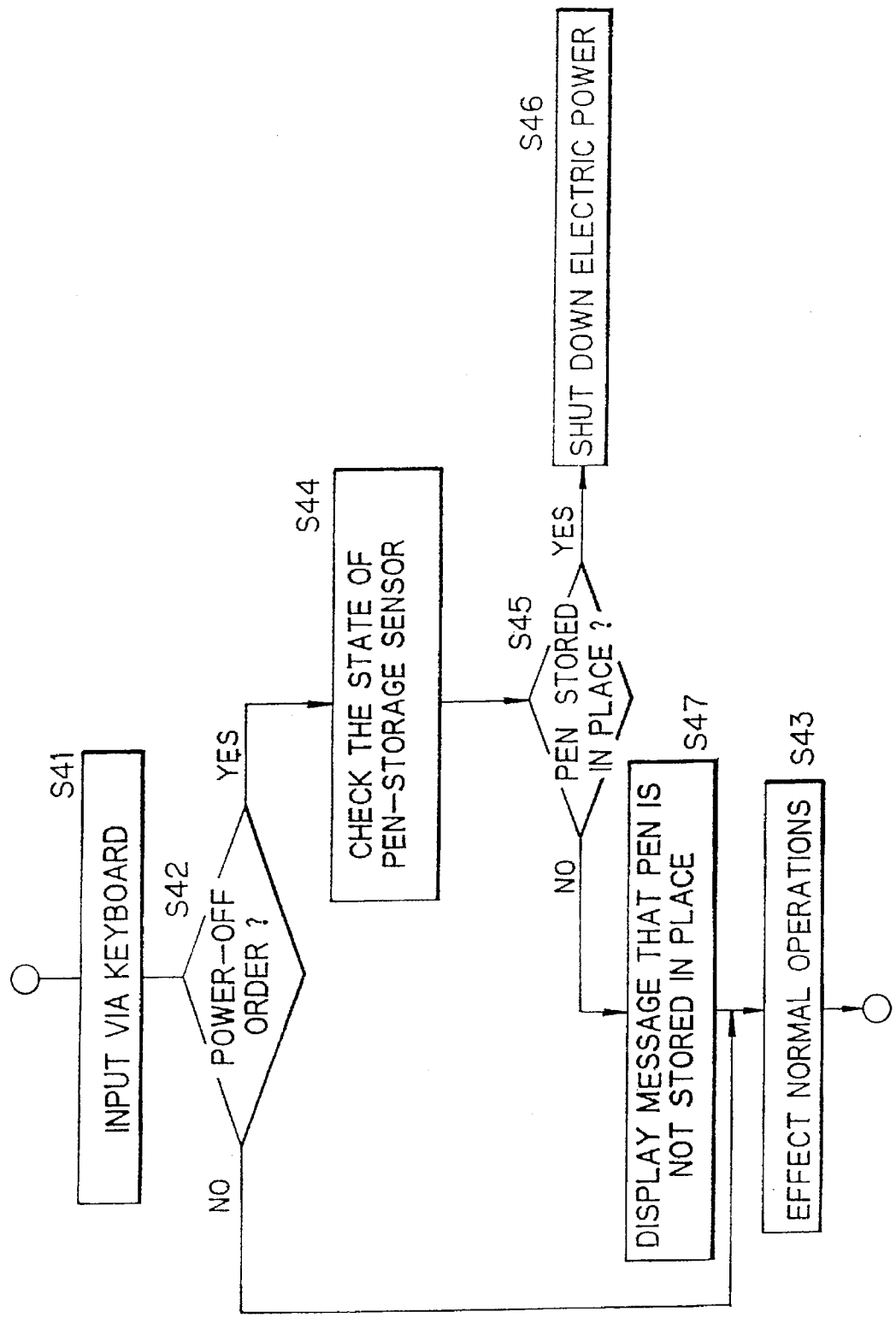

INFORMATION-PROCESSING APPARATUS EQUIPPED WITH A CORDLESS PEN

This application is a continuation of application Ser. No. 08/187,477 filed on Jan. 28, 1994, now abandoned.

BACKGROUND OF THE INVENTION

1. Field of the Invention

The present invention relates to an information-processing apparatus equipped with a cordless pen such as word processors, personal computers, electric notebooks and the like.

2. Description of the Prior Art

FIGS. 1A and 1B are perspective views showing a typical word processor as a prior art information-processing apparatus equipped with a cordless pen. FIG. 1A shows the apparatus without a pen stored and FIG. 1B shows the apparatus with a pen stored. FIG. 2 is a block diagram showing a configuration of the prior art apparatus.

As shown in FIGS. 1A and 1B, the word processor is composed of an upper cabinet 101 and a lower cabinet 102, and the upper cabinet 101 is attached rotatably relative to the lower cabinet 102. The word processor is in use when the upper cabinet 101 is open. The lower cabinet 102 is provided with a keyboard 103 as an input means. The upper cabinet 101 has a display portion 104 for displaying information and the like inputted via the keyboard 103. Provided on the right side of the display portion 104 is a pen holding case 106 for holding a cordless pen 105 as well as a recess 107 housing the pen holding case 106. A power switch 108 is provided on the side face of the upper cabinet 101.

The pen holding case 106 is attached to and disposed rotatably on the bottom of the recess 107. The recess 107 is formed such that the upper face of the pen holding case 106 flush with the inner face of the upper cabinet 101 when the pen holding case 106 is restored.

Referring now to FIG. 2, a system of the conventional word processor will be described. The prior art system includes a central processing unit 121 for effecting various operations; a display device 122 for effecting display output; a keyboard input device 123 for allowing input of characters and etc., through keyboard 103; a main memory 124 for storing program data and the like therein; a pen input device 125 for effecting position input through a pen; an auxiliary memory device 126 for storing program data and the like therein; an electric power unit 127 for supplying electric power to the whole system; and a speaker 128 for generating beeps.

Typical cordless pen-equipped information-processing apparatuses would be thus composed in general in the initial stage of the development.

Although the thus configurated information-processing apparatus equipped with a cordless pen has a means for storing the cordless pen, the apparatus is not provided at all with a detecting means for detecting whether or not the pen holding case is inserted into the recess of the cabinet after the cordless pen is replaced in the pen holding case. Therefore, despite the fact that the pen is not stored, the power might be deactivated and the cabinet would be closed. Accordingly, it was impossible to prevent loss of the cordless pen before.

To deal with such a drawback, various proposals have been made to prevent the loss of the cordless pen.

Japanese Patent Application Laid-Open Hei 2 No. 100712, for example, has disclosed a hand-writable input apparatus in which a cordless pen is prevented from not being returned to its storage location. This mechanism will be explained with reference to FIGS. 3A and 3B. These figures are partial illustrative views showing a vicinity of a cordless pen storing portion in the hand-writable input apparatus. FIG. 3A, in particular, shows the apparatus without the cordless pen stored and FIG. 3B shows the apparatus with the pen stored.

In FIGS. 3A and 3B, reference numerals 4 and 6 designate a cordless pen and a storing portion, respectively. The apparatus further includes a pen storage-detecting portion 7 which supplies a detection signal to an unillustrated controller in order to indicate the detection state by means of a buzzer or display means.

Disposed in the lower part of the storing portion 6 is a hole 8 through which a moving piece 9 projects into the storing portion 6. The moving piece 9 and a fixed piece 10 capable of contacting with the moving piece 9, in cooperation, form a switch. Accordingly, if the cordless pen 4 is not stored as shown in FIG. 3A, the pieces 9 and 10 are separate from each other. On the other hand, if the cordless pen 4 is replaced in the storing portion 6 as shown in FIG. 3B, the pieces 9 and 10 are brought into contact with each other to turn on the switch, whereby the detection signal is supplied to the controller. This input apparatus is constructed such that the state of the cordless pen 4 or whether the pen is stored in place or displaced is detected simultaneously when the power switch of the input apparatus is turned off. In one word, this apparatus is adapted to give a warning if the pen 4 is not stored in place when the power switch is turned off.

As another publicly known art, Japanese Patent Application Hei 2 No. 125324 discloses a coordinate-point input apparatus using a cordless coordinate-point input pen. Also in this art, an improvement is made in order to prevent the cordless pen from not being returned to its storage location. In the apparatus, there is provided means for informing whether or not the input pen is held in a pen holding means when the power is deactivated. This mechanism will be described with reference to FIG. 4. The figure is a schematic illustration showing a configuration of a vicinity of the pen holding means in the art. Reference numerals 1 and 30 designate a cordless pen and a pen holding means 30, respectively. Provided on the bottom inside of the holding means 30 is a switch 31 which is turned on and off by sensing presence and absence (or weight) of the pen 1. A pen detecting circuit 32 inspects the state of the switch 31. On the other hand, the coordinate-point input apparatus itself has a switch 36 for main power supply and further includes a power off detecting circuit 34 for inspecting power supply to an unillustrated operating controlling circuit, etc., and a buzzer activating circuit 35. When the buzzer activating circuit 35 receives a signal from the pen detecting circuit 32 carrying information of displacement of the pen 1 from the pen holding means 30 and another signal from the power off detecting circuit 34 carrying information of disengagement of the power supply to the apparatus body, the buzzer 33 is activated to give an alarm.

The above-described both examples are provided with means which informs the disengagement of the pen if the pen is not stored when the power is turned off. Nevertheless, in such a configuration, if the pen is unmounted for a prolonged period of time, there is a possibility of not being able to prevent the pen from not being returned to its storage location. In particular, in the above examples, since the power switch of the main apparatus can be turned off even if the pen is not stored in place, the pen could go unreturned as easily expected while the apparatus is left with the pen unmounted for a prolonged period of time.

SUMMARY OF THE INVENTION

It is therefore an essential object of the present invention to prevent an operator from forgetting to replace a cordless pen so as not to lose the pen when an information-processing apparatus is used. A further object of the present invention is to provide an information-processing apparatus which not only includes a detecting means for merely detecting the storage of the pen as in the prior art but also includes means for positively warning the operator that the pen is not replaced by providing additional improved means.

The present invention has been achieved to attain the above objects and a first aspect of the present invention resides in that an information-processing apparatus equipped with a cordless pen comprises:

a cordless pen used for input operation;

a pen storing portion for storing the cordless pen;

pen storage-judging means for judging whether or not the cordless pen is stored in the pen storing portion;

measuring means for measuring, in response to a state where the cordless pen is judged as being not stored in the pen storing portion by the pen storage-judging means, a time interval elapsed from a most recent input operation to of a user input device the information-processing apparatus;

comparing means for comparing the time interval measured to a constant time determined in advance; and informing means for informing that the cordless pen is not stored in the pen storing portion when the measured interval time is judged as exceeding the constant time at the comparing means;

the input operation of the user input device contributing data to the information-processing device such that the data has a principal purpose distinct from the ancillary purpose of triggering the measuring means.

The apparatus having the above configuration prevents the operator from forgetting to store the pen in place. It does so by measuring, in response to a state where the cordless pen is judged as being not stored in the pen storing portion by the pen storage-judging means, a time interval elapsed from a most recent input operation of a user input device to the information-processing apparatus and informing via an alarm that the cordless pen is not stored in the pen storing portion when the elapsed interval time is judged as exceeding the constant time. By making such an elapsed time measurement, the timing of the alarm is optimized to have the greatest effect on the user.

A second feature of the present invention resides in that an information-processing apparatus equipped with a cordless pen comprises:

a cordless pen used for input operation;

a pen storing portion for storing the cordless pen;

a first cabinet;

a second cabinet, the first cabinet is attached to and disposed rotatably relative to the second cabinet;

open/close judging means for judging whether or not the first cabinet is closed relative to the second cabinet;

pen-storage judging means for judging whether or not the cordless pen is stored in the pen storage portion in response to a state when the open/close judging means judges that the cabinets are closed together; and informing means for informing that the cordless pen is not stored in the pen storing portion in response to a state when the cordless pen is judged as being out of place.

The apparatus thus constructed judges whether or not the cordless pen is stored in the pen storage portion when the open/close judging means issues affirmative output; and informs the user that the cordless pen is not stored in the pen storing portion if the cordless pen is judged as being out of place, whereby closure of the cabinet without the pen being replaced is prevented.

A third feature of the present invention lies in that an information-processing apparatus equipped with a cordless pen comprises: a cordless pen used for input operation; and a pen storing portion for storing the cordless pen, the pen storage portion comprises: a pen holding case for directly holding the cordless pen; and a recess for storing the pen holding case, and the pen holding case is attached to and disposed rotatably on one end of the recess and having a locking lever being disposed such that contact with the pen holding case causes the locking lever to rotate. The locking lever rotatably locks locks an electric power switch so as to prevent actuation of the switch when the pen holding case is not replaced in the recess and releases this locked condition so as to allow the electric power switch to be actuated when the pen holding case is placed in the recess.

The apparatus thus constructed includes the pen storage portion comprising a pen holding case for directly holding the cordless pen and a recess for storing the pen holding case while the pen holding case is attached to and disposed rotatably on one end of the recess. The apparatus further includes a locking lever which is in link with the rotational operation of the pen holding case relative to the recess, whereby the locking lever locks an electric power switch so as not to be operated when the pen holding case is not stored in the recess and releases the locked condition so as to allow the electric power switch to be operated when the pen holding case is placed in the recess.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 4 is a schematic illustrative view showing a configuration of a vicinity of a pen holding means in a prior art coordinate-point input apparatus;

FIG. 5A is a perspective view showing an embodiment of a word processor as an information-processing apparatus equipped with a cordless pen according to the present invention without the pen stored in place;

FIG. 5B is a perspective view showing an embodiment of a word processor as an information-processing apparatus equipped with a cordless pen according to the present invention with the pen stored in place;

FIG. 7 is a block diagram sowing a system of an embodiment according to the present invention;

FIG. 8 is a flowchart of an embodiment of the system shown in FIG. 7;

FIG. 12 is an enlarged side view showing an electric power switch portion in a word processor according to still another embodiment of the present invention;

FIG. 15 is a flowchart showing the referential example of the system shown in FIG. 14.

DESCRIPTION OF THE PREFERRED EMBODIMENTS

Embodiments of the present invention will hereinafter be described with reference to the accompanying drawings.

Figure 6A:
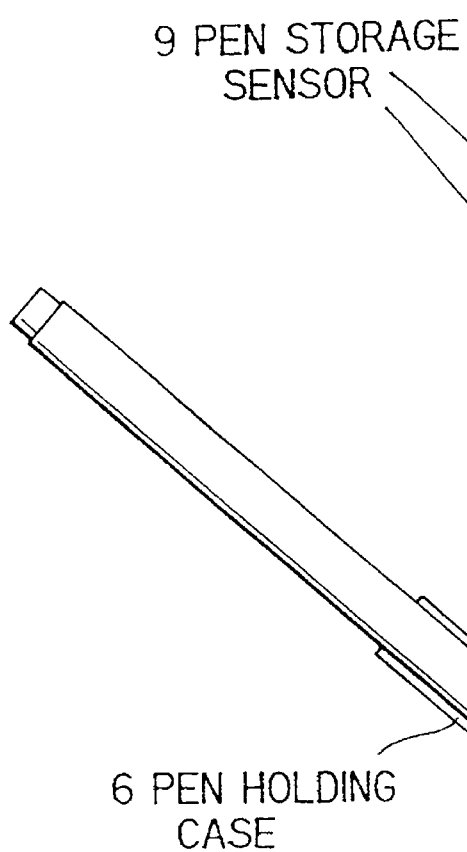
FIG. 6A is a sectional view of an upper cabinet of the word processor shown in FIG. 5A.
Figure 6B:
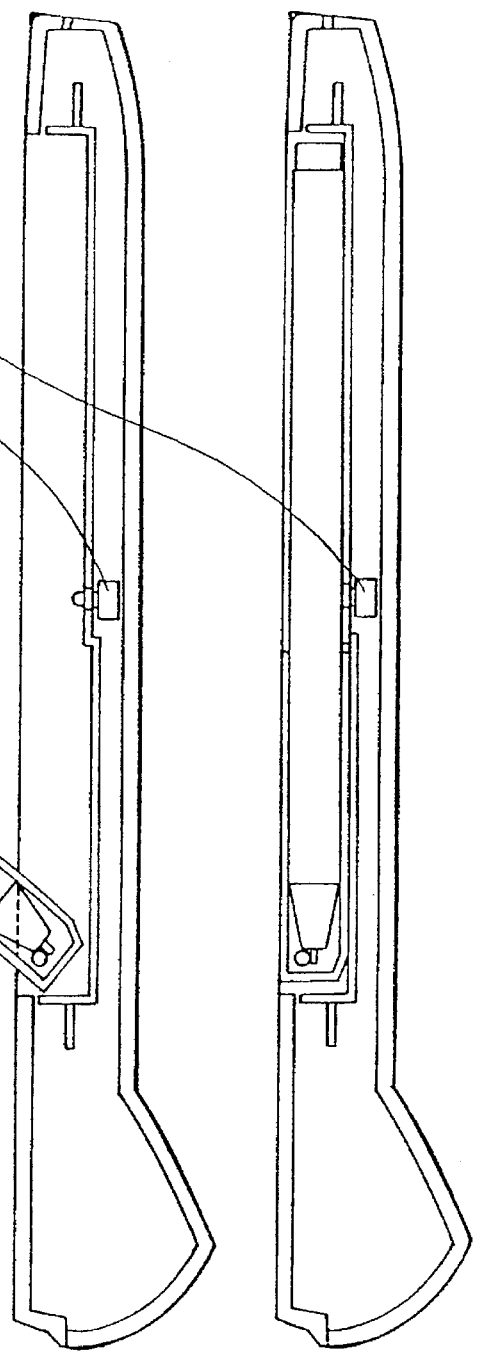
FIG. 6B is a sectional view of an upper cabinet of the word processor shown in FIG. 5B.

FIGS. 5A and 5B are perspective views showing an embodiment of a word processor as an information-processing apparatus equipped with a cordless pen according to the present invention. FIGS. 6A and 6B are sectional views showing an upper cabinet of the word processor as the embodiment of the information-processing apparatus equipped with a cordless pen according to the present invention. FIGS. 5A and 6A show states before the pen is stored and FIGS. 5B and 6B shows states after the pen is stored.

Figure 1B:
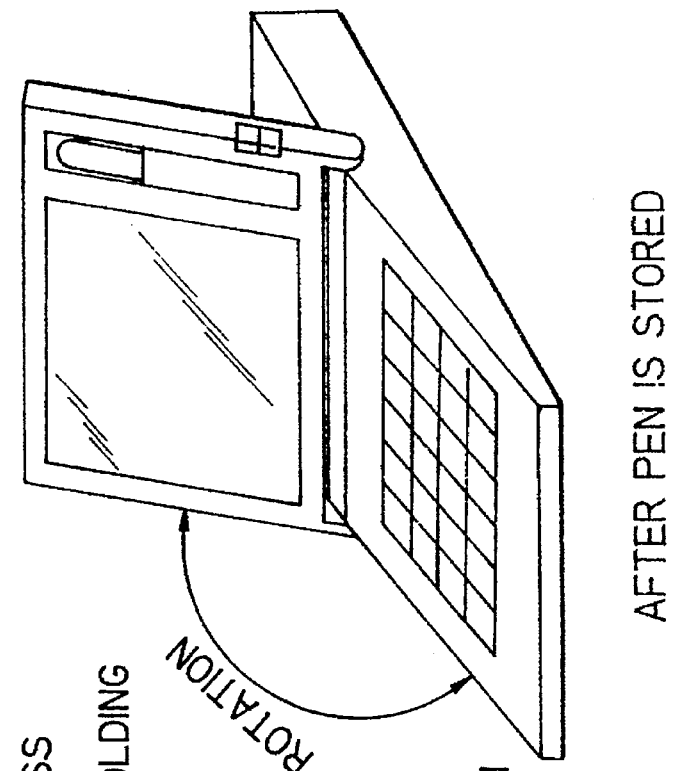
FIG. 1B is a perspective showing a prior art example of a word processor as an information-processing apparatus equipped with an cordless pen with the pen stored in place.
Figure 1A:
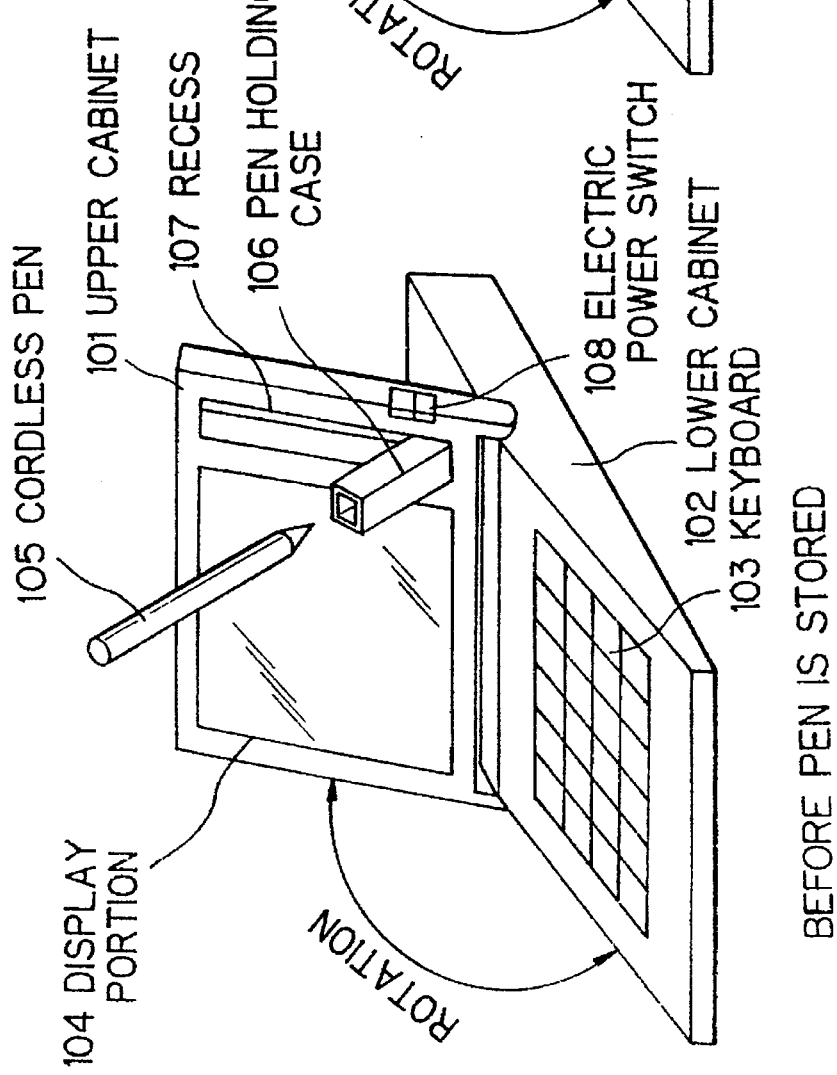
FIG. 1A is a perspective showing a prior art example of a word processor as an information-processing apparatus equipped with an cordless pen without the pen stored.
Figure 2:
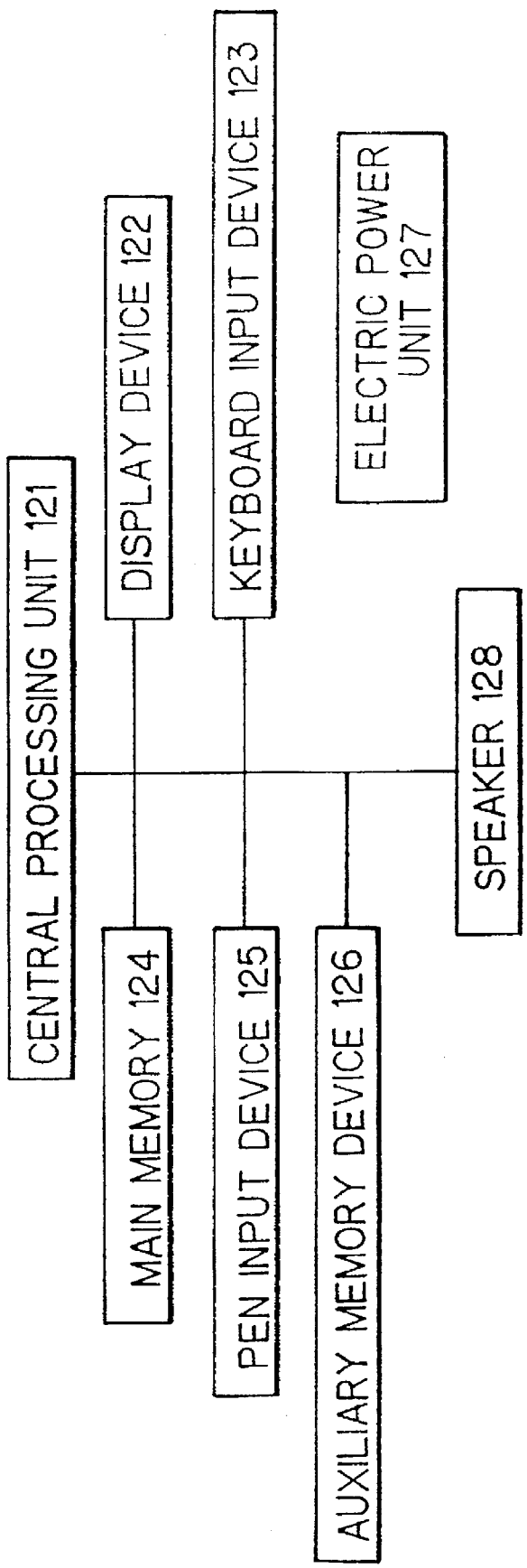
FIG. 2 is a block diagram of a system of a conventional word processor.
Figure 3A:
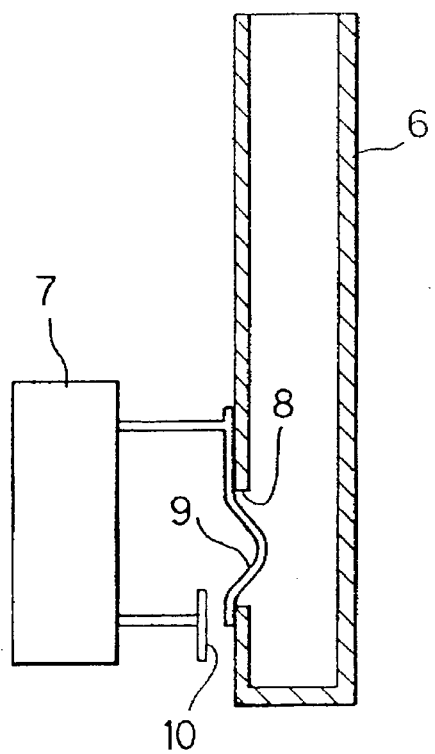
FIG. 3A is a partial illustrative view showing a vicinity of a cordless pen storing portion of a prior art hand-writable input apparatus.
Figure 3B:
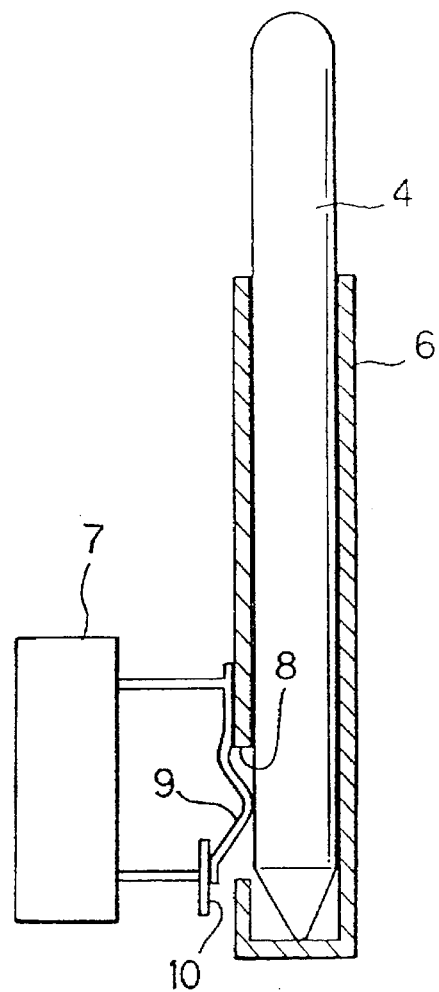
FIG. 3B is a partial illustrative view showing the apparatus shown in FIG. 3A with the cordless pen stored in the holding portion.

As illustrated in FIGS. 5A and 5B, the appearance of the word processor of the embodiment of the present invention is similar to that of the apparatus shown in FIGS. 1A and 1B as the prior art example. Specifically, the word processor of the present invention is composed of an upper cabinet 1 and a lower cabinet 2, and the upper cabinet 1 is attached rotatably relative to the lower cabinet 2. The word processor is in use when the upper cabinet 1 is open. The lower cabinet 2 is provided with a keyboard 3 as an input means. The upper cabinet 1 has a display portion 4 for displaying information and the like inputted via the keyboard 3. Provided on the right side of the display portion 4 is a pen holding case 6 for holding a cordless pen 5 as well as a recess 7 housing the pen holding case 6. A power switch 8 is provided on the side face of the upper cabinet 1.

As illustrated in FIGS. 5A and 5B as well as FIGS. 6A and 6B, the pen holding case 6 is attached to and disposed rotatably on the bottom of the recess 7. The recess 7 is formed such that the upper face of the pen holding case 6 is flush with the inner face of the upper cabinet 1 when the pen holding case 6 is replaced. The apparatus of the embodiment is further provided at the bottom of the recess 7 with a pen-storage sensor 9 which detects whether or not the pen is stored. The pen-storage sensor 9 is disposed in such a position as to directly contact with the cordless pen 5 in order to surely detect the storage of the cordless pen 5 in the recess 7 as the pen 5 is held in the pen holding case 6. The pen-storage sensor 9 is turned on when the cordless pen 5 is replaced and the sensor 9 is turned off when no cordless pen 5 is replaced.

Referring next to FIGS. 7 and 8, processing of an embodiment of the present invention will be described. FIG. 7 is a block diagram of the embodiment of the present invention and FIG. 8 is a flowchart of the embodiment of the present invention.

The system of the present invention includes a central processing unit 21 for effecting various operations; a display device 22 for effecting display output; a keyboard input device 23 for allowing input of characters and etc., through keyboard 3; a main memory 24 for storing program data and the like therein; a pen input device 25 for effecting position input through a pen; an auxiliary memory device 26 for storing program data and the like therein; an electric power unit 27 for supplying electric power to the whole system; a speaker 28 for generating beeps; and a pen-storage sensor input unit 29 for detecting the existence of pen stored in place.

The central processing unit 21 checks the state of the pen-storage sensor input device 29 in accordance with the program stored in the auxiliary memory device 26 (S1). Then a judgment is made on whether or not the cordless pen 5 is stored in place (S2). If the cordless pen 5 is stored in place (YES), normal operations proceed (S3). In contrast, if no cordless pen 5 is stored (NO), the central processing unit 21 measures a time from the last input through the keyboard input device 23 or pen input device 25 up to a next input (S4, S5). If an input is made within a predetermined time stored in advance in the main memory 24, or in other words, if a long time has not passed (NO), normal operations follow (S3). On the other hand, if no input is made after the passage of the predetermined time or a long time has passed (YES), the display device 22 displays a warning message that the cordless pen 5 is not stored in place and in synchronization with this warning the speaker 28 sounds an alarm (S6). These operations will be repeated at intervals of a constant, i.e., given, period.

In the above embodiment, the storage of the pen is checked at intervals of a constant period of time. If the pen is not stored in place, the word processor is judged as being in operation, but if no operation is made in a predetermined period of time, it is determined that the pen must be forgotten to be replaced and a warning is given.

This warning may prevent the user from forgetting to replace the pen and therefore losing the pen. It is also possible to prevent improper data input as well as damage to the keyboard, display portion and the cordless pen, all of which would be caused if the display portion is closed while the pen receiving case being out or the cordless pen being left on the keyboard.

Figure 9:
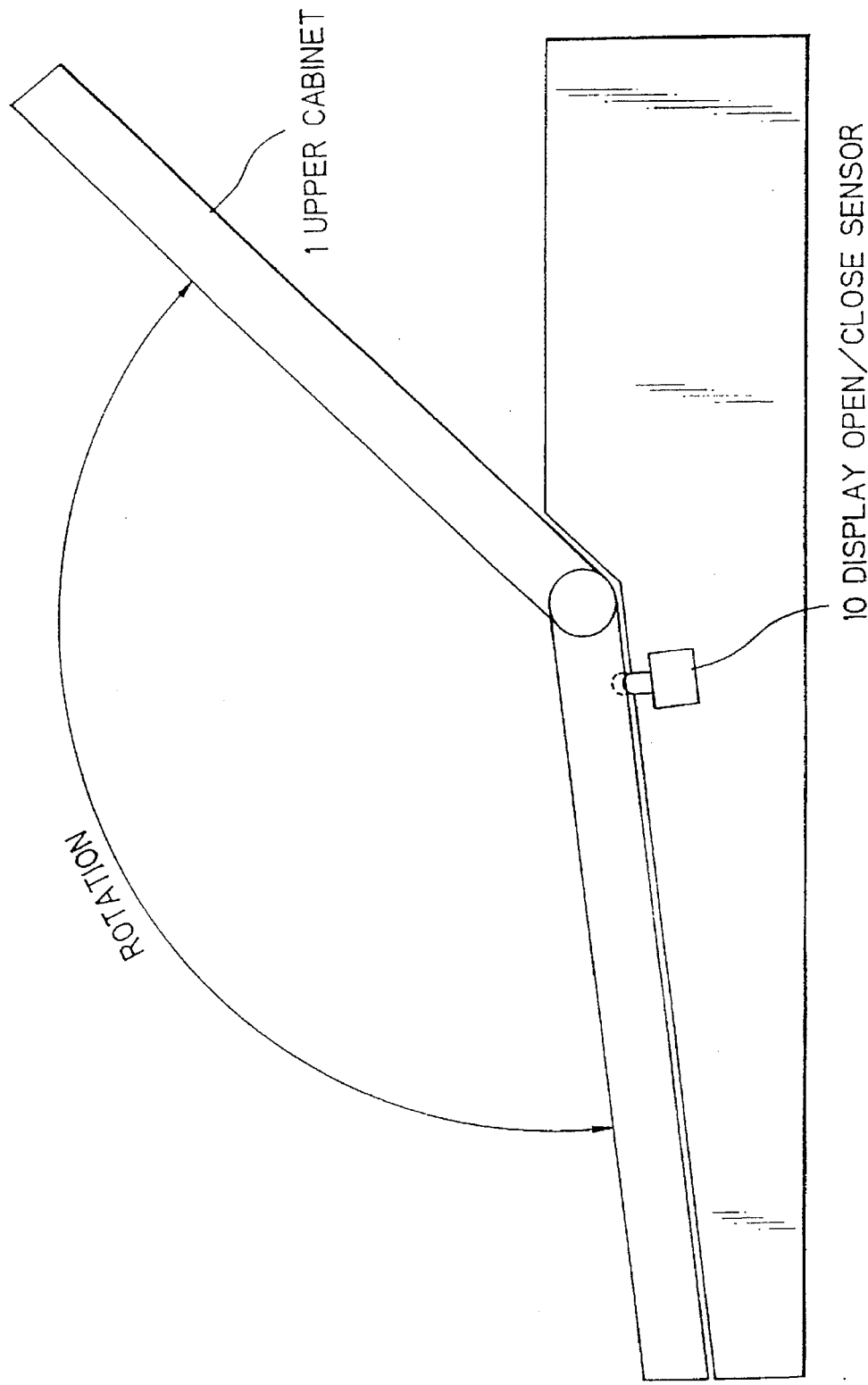
FIG. 9 is a side view showing a word processor according to another embodiment of the present invention.

Another example of a word processor of the present invention described hereinafter includes a similar configuration to that of the word processor shown in FIGS. 5A and 5B and FIGS. 6A and 6B. With regards to the pen storage, a mechanism is provided in which the cordless pen 5 is stored in the pen holding case 6 and the pen 5 is taken out and replaced by rotating the pen holding case 6. This mechanism further includes a pen-storage sensor 9 which is turned on when the pen is stored in place and which is turned off when no pen is stored in place. Moreover, as shown in FIG. 9 which is a side view of a word processor as an embodiment of an information-processing apparatus equipped with a cordless pen according to the present invention, a display open/close sensor 10 is provided which is turned on when the upper cabinet 1 is closed mating with the lower cabinet 2 and which is turned off when the upper cabinet 1 is opened.

Figure 10:
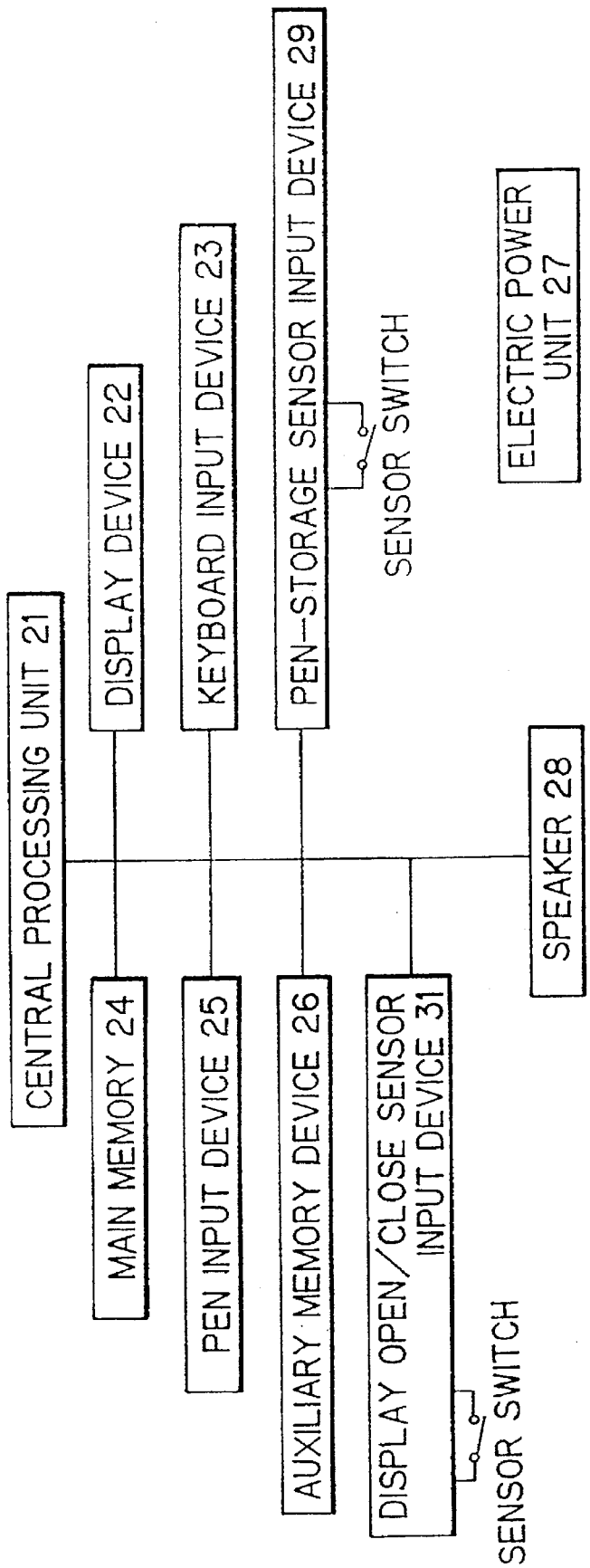
FIG. 10 is a block diagram showing a system of the embodiment shown in FIG. 9.
Figure 11:
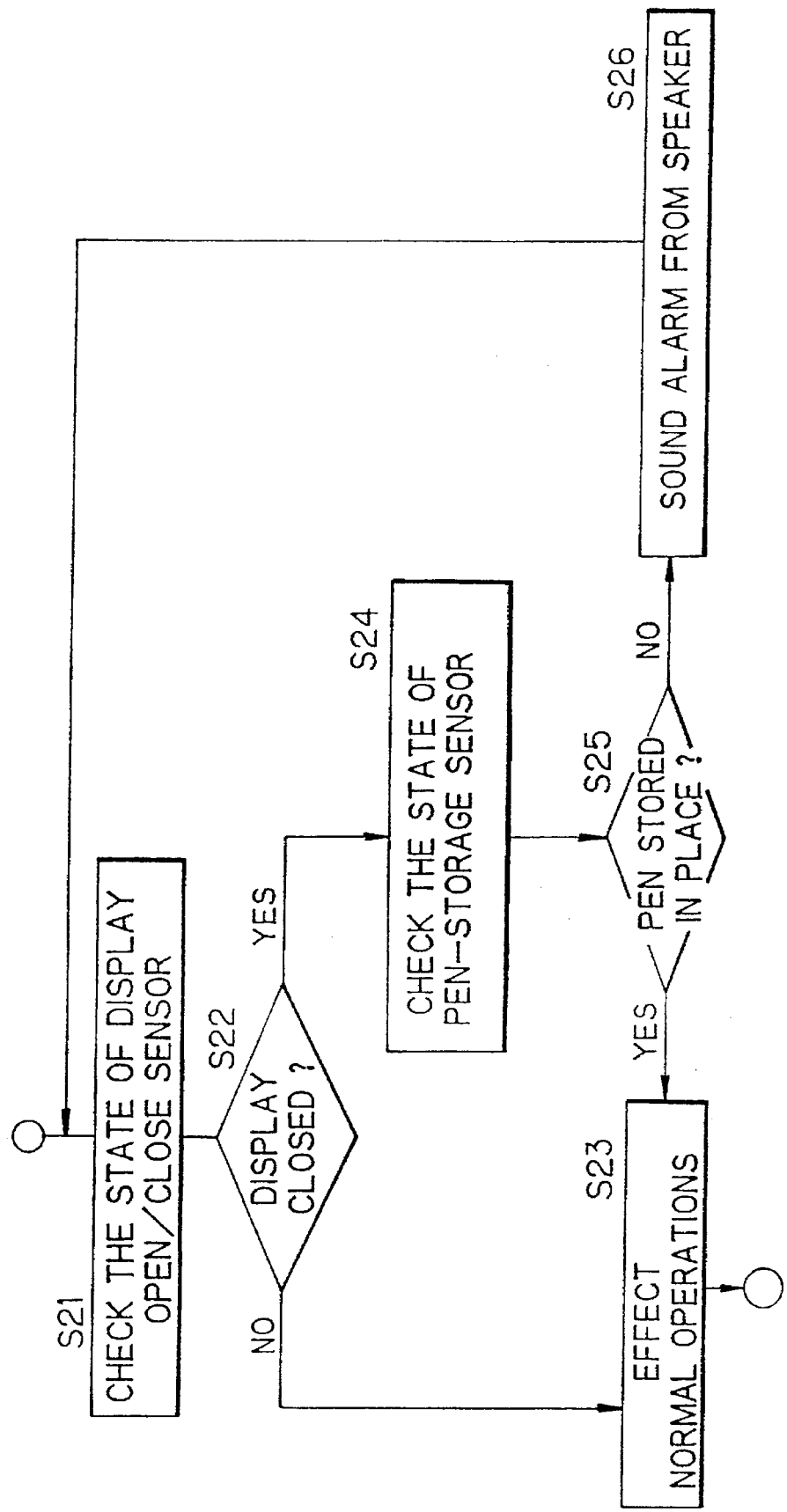
FIG. 11 is a flowchart of an embodiment of the system shown in FIG. 10.

FIG. 10 is a block diagram showing an embodiment of the present invention and FIG. 11 is a flowchart of an embodiment of the present invention. Referring to these figures, an embodiment of the present invention will be described.

The system of the present invention is composed of a central processing unit 21 for effecting various operations; a display device 22 for effecting display output; a keyboard input device 23 for allowing input of characters and etc., through keyboard 3; a main memory 24 for storing program data and the like therein; a pen input device 25 for effecting position input through a pen; an auxiliary memory device 26 for storing program data and the like therein; an electric power unit 27 for supplying electric power to the whole system; a speaker 28 for generating beeps; a pen-storage sensor input unit 29 for detecting the existence of the pen stored; and a display open/close sensor input device 31 for detecting whether the display portion is opened or closed.

The central processing unit 21 checks the state of the display open/close sensor input device 31 in accordance with the program stored in the main memory device 24 (S21). Then, a judgment is made on whether or not the display (upper cabinet) is closed (S22). If the display is not closed (NO) normal operations proceed (S23). When the display is closed (YES), the central processing unit 21 checks the state of the pen-storage sensor input device 29 (S24) and a judgment is made on whether or not the cordless pen 5 is stored (S25). If the cordless pen 5 is stored in place (YES), normal operations follows (S23). In contrast, if no cordless pen 5 is stored (NO), the speaker 28 generates an alarm sound (S26).

In the above embodiment, the display open/close sensor is provided and if the display is closed, a judgment is made on whether the pen is replaced or not. In this judgment, if the pen is judged as being not stored in place, the apparatus gives a warning message that the pen is not in place so as to prevent the display from being closed without the pen being replaced.

This warning may prevent the user from forgetting to replace the pen and therefore losing the pen. It is also possible to prevent improper data input as well as damage to the keyboard, display portion and the cordless pen, all of which would be caused if the display portion is closed while the pen receiving case being out or the cordless pen being left on the keyboard.

Another example of a word processor of the present invention described next includes a similar configuration to that of the word processor shown in FIGS. 5A and 5B. With regards to the pen storage, a mechanism is provided in which the cordless pen 5 is stored in the pen holding case 6 and the pen 5 is taken out and replaced by rotating the pen holding case 6.

Figure 13A:
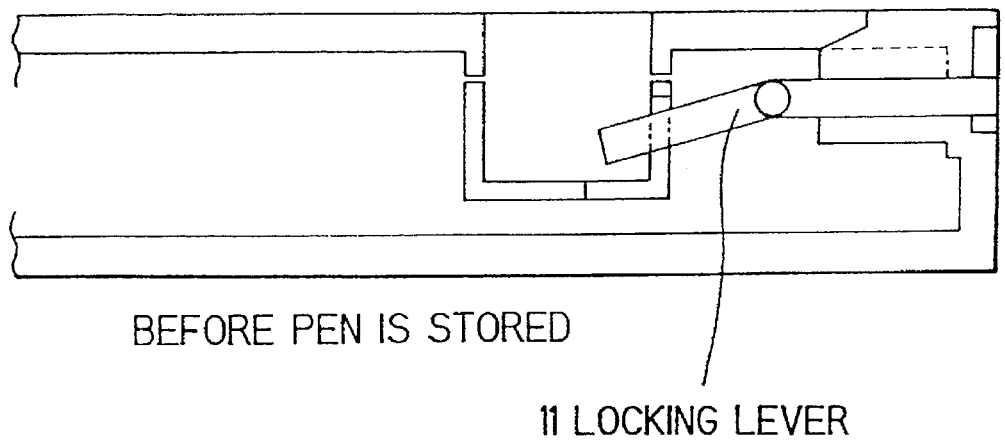
FIG. 13A is a sectional view showing a state of the electric power switch shown in FIG. 12 before a pen is stored in place.
Figure 13B:
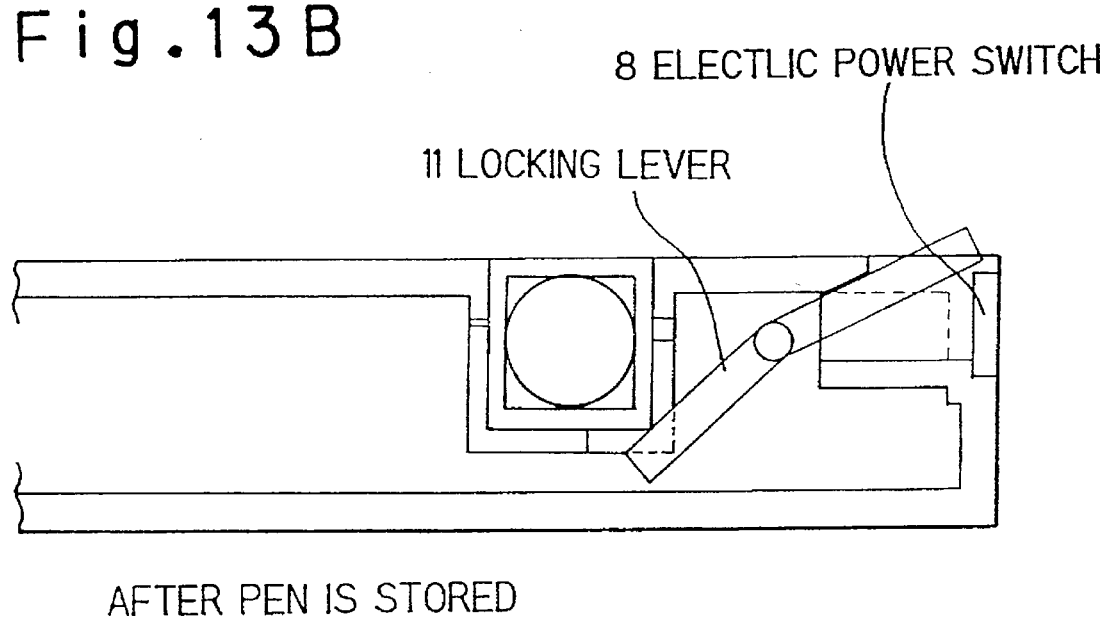
FIG. 13B is a sectional view showing a state of the electric power switch shown in FIG. 12 after a pen is stored in place.

FIG. 12 is an enlarged side view showing an electric power switch portion in a word processor as an embodiment of an information-processing apparatus equipped with a cordless pen according to the present invention. FIGS. 13A and 13B are sectional views showing a cabinet of the word processor as an embodiment of the information-processing apparatus equipped with a cordless pen according to the present invention. FIG. 13A and 13B show states of the electric power switch before and after a pen is replaced, respectively.

The apparatus of the embodiment includes the storage structure shown in FIGS. 5A and 5B and further has a locking lever 11 for regulating ON/OFF operation of an electric power switch 8 disposed in the upper cabinet 1. The electric power switch 8 is of sliding type and locked by the locking lever 11 as follows. Namely, when the pen holding case 6 is not replaced in the recess 7, the switch 8 is locked so as not to be slid or so as not to allow the ON/OFF operation of the electric power switch 8. On the other hand, when the pen holding case 6 is replaced in the recess, the locking lever 11 is released to allow the electric power switch 8 to slide.

In the above embodiment, by providing a locking lever which functions in link with the rotation of the pen holding case relative to the recess, the ON/OFF operation is regulated where the pen is not stored in place.

This mechanism may prevent the user from forgetting to replace the pen and therefore losing the pen. It is also possible to prevent improper data input as well as damage to the keyboard, display portion and the cordless pen, all of which would be caused if the display portion is closed while the pen receiving case being out or the cordless pen being left on the keyboard.

With the configuration described above, it is possible to prevent the user from forgetting to replace the pen and therefore losing the pen. It is also possible to prevent improper data input as well as damage to the keyboard, display portion and the cordless pen, all of which would be caused if the display portion is closed while the pen receiving case being out or the cordless pen being left on the keyboard.

Although some configurations of the present invention have been described heretofore, it is also possible to construct, for reference, an apparatus in which a judgment is made on whether or not the cordless pen is replaced in the pen storing portion when a power-off order is issued through an input means. In such a configuration, if the pen is stored in place, the power is shut down. On the other hand, if the pen is not stored in place, the apparatus gives a warning that the cordless pen is not stored in the pen storing portion and prevents the power from being shut down with the pen being out of place.

An example of the configuration will be described with regards to the word processor shown in FIGS. 5A and 5B as well as 6A and 6B.

Figure 14:
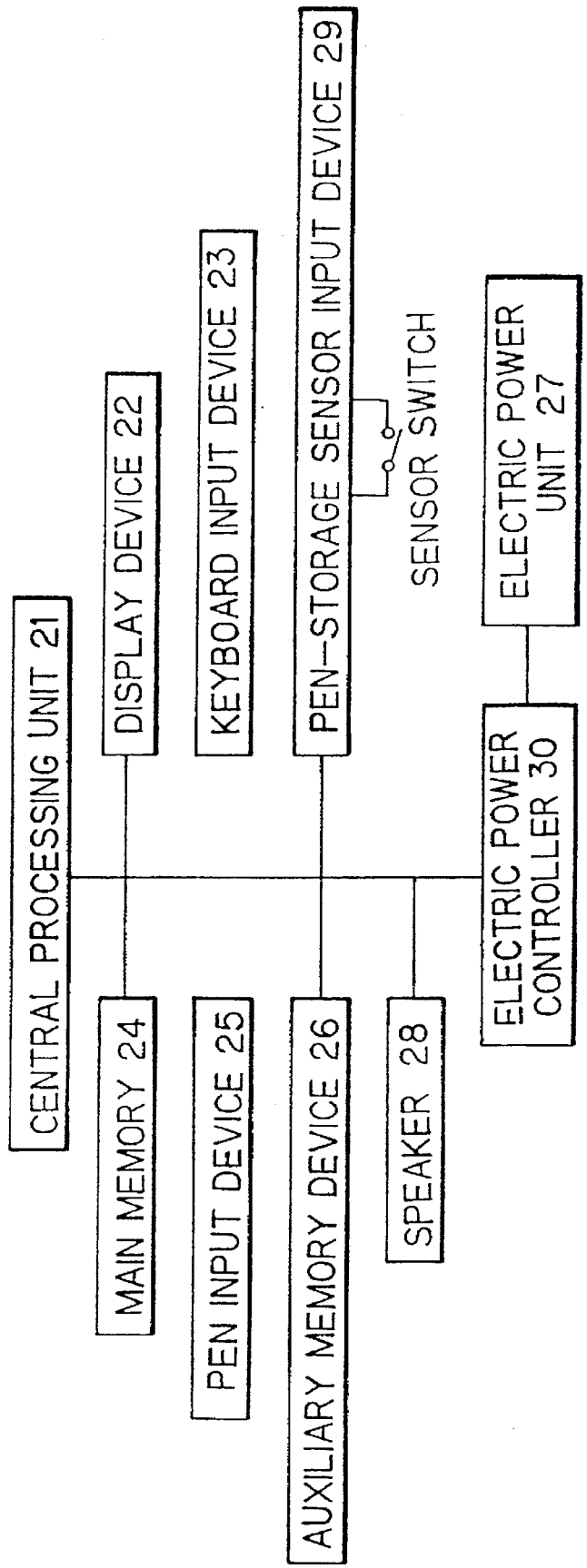
FIG. 14 is a block diagram showing a system of a referential example of the present invention.

FIG. 14 is a block diagram of this example and FIG. 15 is a flowchart showing the operations of the configuration. Description will be made with reference to these figures.

The above system is composed of a central processing unit 21 for effecting various operations; a display device 22 for effecting display output; a keyboard input device 23 for allowing input of characters, etc., through keyboard 3; a main memory 24 for storing program data and the like therein; a pen input device 25 for effecting position input through a pen; an auxiliary memory device 26 for storing program data and the like therein; an electric power unit 27 for supplying electric power to the whole system; a speaker 28 for generating beeps; a pen-storage sensor input unit 29 for detecting the existence of pen-storage; and an electric power controlling device 30 for controlling the electric power unit 27 based on a program.

In this configuration, receiving an input through the keyboard input device 23 (S41), the central processing unit 21, in accordance with the program stored in the main memory 24, judges whether or not the input indicates the power-off order (S42). If the input is not of the power-off order (NO), normal operations proceed (S43). On the other hand, if the input is of the power-off order (YES), the central processing unit 21 checks the state of the pen-storage sensor input device 29 (S44) and judges whether or not the cordless pen 5 is stored in place (S45). If the cordless pen 5 is stored in place (YES), the electric power unit 27 is turned off by means of the electric power controlling device 30 (S46). In contrast, if the cordless pen 5 is not in place (NO), a message is displayed on the display device 22 that the cordless pen 5 is not stored in place (S47), and the power is not shut down to effect normal operations (S43).

In this configuration, the power-off operation is effected by the input through the keyboard. When the pen is not replaced, the power-off operation will not be effected and the apparatus gives a warning which indicates that the pen is out of place as well as prevents the power from being turned off with the pen out of place.

By this warning, it is possible to prevent the user from forgetting to replace the pen and therefore losing the pen. It is also possible to prevent improper data input as well as damage to the keyboard, display portion and the cordless pen, all of which would be caused if the display portion is closed while the pen receiving case being out or the cordless pen being left on the keyboard.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information-processing apparatus equipped with a cordless pen comprising:

a cordless pen used for input operation;

a pen storing portion for storing said cordless pen;

determination means for determining whether or not said cordless pen is stored in said pen storing portion;

measuring means for measuring, in response to a state where said cordless pen is determined as being not stored in said pen storing portion by said determination means, an elapsed time elapsed from a most recent input operation of a user input device in said information-processing apparatus;

comparing means for comparing the elapsed time to a reference time determined in advance; and informing means for informing the user that said cordless pen is not stored in said pen storing portion when the elapsed time is determined as exceeding said reference time at said comparing means;

the input operation of the user input device contributing data to the information processing apparatus such that the data has a principal purpose distinct from an ancillary purpose of triggering the measuring means.

2. An apparatus as in claim 1, wherein:

the most recent input operation of a user input device is operation of the cordless pen.

3. An operation as in claim 1, wherein:

the informing means, when actuated, informs the user periodically.

4. An information-processing apparatus including a housing equipped with a cordless pen comprising:

a cordless pen used for input operation; and a pen storing portion for storing said cordless pen;

said pen storage portion comprising:

a pen holding case for directly holding said cordless pen; and a recess within the housing for storing said pen holding case, said pen holding case being attached to and disposed rotatably on one end of said recess; and a locking lever;

the locking lever being disposed such that contact with the pen holding case causes the locking lever to rotate; and an electric power switch;

wherein said locking lever rotatably locks the electric power switch so as to prevent actuation of the switch when said pen holding case is not replaced in said recess and rotatably releases this locked condition so as to allow said electric power switch to be actuated when said pen holding case is placed in the recess.

5. A method for preventing a cordless pen input device for a computer from not being returned to a storage location therefor by a forgetful user, comprising the steps of:

(a) determining whether the pen occupies the storage location;

(b) measuring an elapsed time from a most recent input to the computer from a user input device;

(c) comparing, when the pen is absent from the storage location, the elapsed time against a reference value; and (d) producing, when the elapsed time is equal to or greater than the reference value, a warning signal indicating that the pen is absent from the storage location;

the input operation of the user input device contributing data to the computer such that the data has a principal purpose distinct from an ancillary purpose of triggering the measuring step (b).

6. A method as in claim 5, wherein:

the most recent input to the computer measured in step (b) is an input from the pen.

7. A method as in claim 5, wherein:

the warning signal of step (d), after actuation thereof according to step (c), is produced periodically.

* * * * *